United States Patent
Rajendran et al.

(10) Patent No.: US 9,495,430 B2
(45) Date of Patent: Nov. 15, 2016

(54) SYSTEMS AND METHODS FOR BATCH PROCESSING OF DATA RECORDS IN AN ON-DEMAND SYSTEM

(71) Applicant: salesforce.com, inc., San Francisco, CA (US)

(72) Inventors: Raj Rajendran, Pleasanton, CA (US); Navin K. Ramineni, Pleasanton, CA (US); Priya Sethuraman, Fremont, CA (US); Stephen Gesin, Mountain View, CA (US); Varun Gupta, Berkeley, CA (US)

(73) Assignee: salesforce.com, San Francisco, CA (US)

(*) Notice: Subject to any disclaimer, the term of this patent is extended or adjusted under 35 U.S.C. 154(b) by 532 days.

(21) Appl. No.: 13/963,541

(22) Filed: Aug. 9, 2013

(65) Prior Publication Data

US 2014/0067760 A1 Mar. 6, 2014

Related U.S. Application Data

(60) Provisional application No. 61/697,488, filed on Sep. 6, 2012.

(51) Int. Cl.
  *G06F 7/00* (2006.01)
  *G06F 17/30* (2006.01)

(52) U.S. Cl.
  CPC ... *G06F 17/30575* (2013.01); *G06F 17/30286* (2013.01); *G06F 17/30374* (2013.01)

(58) Field of Classification Search
  CPC .................................................. G06F 17/30286
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 * | 5/2001 | Rothwein ............... H04L 29/06 709/227 |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp et al. |

(Continued)

*Primary Examiner* — Loan T Nguyen
(74) *Attorney, Agent, or Firm* — Dergosits & Noah LLP; Todd A. Noah (57) ABSTRACT

Systems and methods are provided for batch processing of data records in an on-demand system. A marker is stored that identifies a node in an on-demand system and identifies a most recent data record processed in a relational database management system by the node. The marker is used to query the database management system to identify a batch of records for the node to process. The batch of records is processed by the node to update a client of data changes reflected by the batch of records.

16 Claims, 4 Drawing Sheets

(56) References Cited

U.S. PATENT DOCUMENTS

| | | |
|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2* | 8/2003 | Lim .................. G06F 17/30575 |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,412,455 B2 | 8/2008 | Dillon |
| 7,620,655 B2 | 11/2009 | Larsson |
| 7,698,160 B2 | 4/2010 | Beaven et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1* | 9/2002 | Brodersen ................. G06F 8/65 717/174 |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2011/0231848 A1* | 9/2011 | Long ...................... G06F 9/546 718/101 |
| 2011/0258225 A1* | 10/2011 | Taylor ............... G06F 17/30336 707/769 |
| 2012/0259894 A1* | 10/2012 | Varley ............... G06F 17/30575 707/795 |
| 2013/0297695 A1* | 11/2013 | Satyanarayanan .... H04L 65/403 709/204 |

\* cited by examiner

SYSTEMS AND METHODS FOR BATCH PROCESSING OF DATA RECORDS IN AN ON-DEMAND SYSTEM

CLAIM OF PRIORITY

This application claims the benefit of U.S. Provisional Patent Application 61/697,488 entitled METHOD FOR BATCH PROCESSING OF DATA IN AN ON-DEMAND SYSTEM, by Rajendran, et al., filed Sep. 6, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BATCH PROCESSING OF DATA RECORDS IN AN ON-DEMAND SYSTEM

One or more implementations relate generally to batch processing of data records in an on-demand system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

An on-demand system typically includes multiple nodes, such as application servers, that interact with a relational database management system. Each of the nodes may convey selected data updates from a relational database to multiple clients that subscribe to the on-demand system. Each node typically accesses the relational database management system to identify each of the data updates based on timestamps corresponding to the data updates. For example, after an application server conveys selected data updates from the relational database to subscribing clients beginning at 9:00 AM, the relational database management system receives data updates at 9:19 AM, and the application server checks for additional data updates at 9:30 AM by examining the timestamps of the data updates in a transaction table stored in the relational database. The application server skips the data updates with a timestamp from before 9:00 AM because the application server presumably processed these data updates already beginning at 9:00 AM, and only attempts to process the data updates with timestamps between 9:00 AM and 9:30 AM.

However, the relational database management system may receive data updates in bursts, such as 2 million data updates between 9:00 AM and 9:30 AM at 9:19 AM, and no data updates between 9:30 AM and 10:00 AM. Although the relational database management system may have the capacity to receive and process millions of data updates in a short period of time, an application server may not have the capacity to process millions of data updates before the application server is scheduled to process data updates again. Therefore, when the application server is scheduled to process data updates again at 10:00 AM, the application server may not have completed the processing of the 2 million data updates that the application server began processing at 9:30 AM. In this situation, the application server may malfunction, and even crash. The application server may terminate the 9:30 AM job before all of the 2 million data updates were processed, such that the application server does not process the unfinished data updates because these unfinished data updates have 9:19 AM timestamps and the 10:00 AM job only processes updates with timestamps after 9:30 AM, when all of the previous data updates were presumed to have already begun processing. Even though many data updates remain unprocessed, the application server may be idle because no data updates exist with a timestamp between 9:30 AM and 10:00 AM. Alternatively, the application server may begin reprocessing some of the data updates that the application server already processed beginning at 9:30 AM, which may not only waste resources, but also result in yet another job timeout before all of the data updates are processed. Further problems may exist when an application server is taken offline for scheduled maintenance or to repair a problem. When the application server is bought back online, the timestamp of the application server's most recent job may be so long ago relative to the recent data updates that the application server may experience many problems, including some of the problems described above, in an attempt to process all of the data updates that occurred during the application server's downtime.

BRIEF SUMMARY

In accordance with embodiments, there are provided systems and methods for batch processing of data records in an on-demand system. A marker is stored that identifies a node in an on-demand system and identifies the most recent data record processed in a relational database management system by the node. For example, a system stores "9000000_App01" in a transaction table in a relational database to identify that application server number 01 last processed data update record number 9,000,000.

Another marker may be stored that identifies another node in the on-demand system and identifies the most recent data record processed in the relational database management system by the other node. For example, the system may store "9025000_App02" in the transaction table in the relational database to identify that application server number 02 last processed data update record number 9,025,000. The marker is used to query the database management system to identify a batch of records for the node to process. For example, the system uses the marker "9000000_App01" to query the relational database management system for the next 50,000 data update records that are sequentially greater than the data update record number 9,000,000 for application server number 01 to process.

The batch of records is processed by the node to update a client of data changes reflected by the batch of records. For example, the application server number 01 processes the data update records from number 9,000,001 to number 9,050,000, and conveys selected updates to subscribing clients. The other marker may be used to query the database management system to identify another batch of records for the other node to process. For example, the system may use the marker "9025000_App02" to query the relational database management system for the next 50,000 data update records that are sequentially greater than the data update record number 9,025,000 for application server number 02 to process. The other batch of records may be processed by the other node to update another client of data changes reflected by the other batch of records. For example, the application server number 02 may process the data update records from number 9,025,001 to number 9,075,000, and convey selected updates to subscribing clients. Accordingly, systems and methods are provided for the batch processing of data records in an on-demand system that enables load distribution across time, which also enables offline nodes to catch up with their data update processing when returned online.

While one or more implementations and techniques are described with reference to an embodiment in which batch processing of data records in an on-demand system is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for batch processing of data records in an on-demand system.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for batch processing of data records in an on-demand system will be described with reference to example embodiments.

The following detailed description will first describe a method for batch processing of data records in an on-demand system.

Next, an example of a system for batch processing of data records in an on-demand system is described.

Figure 1:
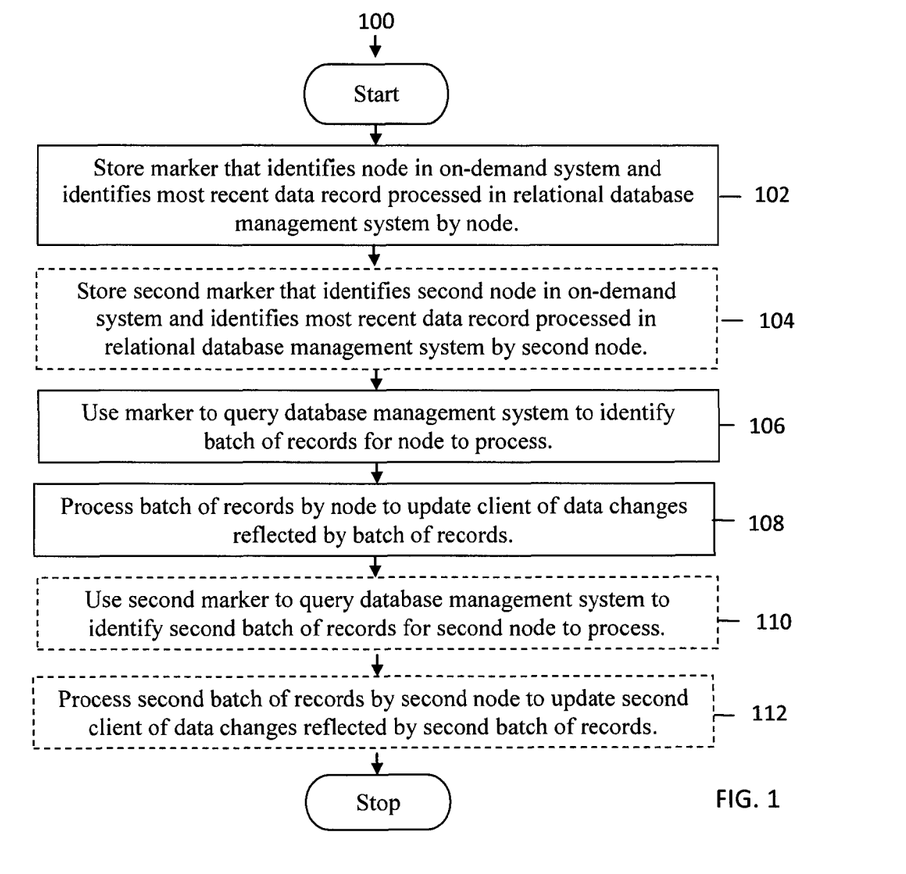
FIG. 1 is an operational flow diagram illustrating a high level overview of a method for batch processing of data records in an on-demand system in an embodiment.

FIG. 1 is an operational flow diagram illustrating a high level overview of a method 100 for batch processing of data records in an on-demand system. As shown in FIG. 1, a system can batch process data records in an on-demand system.

In block 102, a marker is stored that identifies a node in an on-demand system and identifies the most recent data record processed in a relational database management system by the node. For example and without limitation, this can include an application server number 01 storing "9000000_App01" in a transaction table in a relational database to identify that application server number 01 last processed data update record number 9,000,000. A marker enables a node to restart the processing of data updates after the record which the node last processed. A marker may be a pointer to a unique row identifier in a relational database management system, and may be a key-value combination. For example, the key-value pair may be "last_processed_id_in_contact_24hr_for_mmi_1, 15" or "last_processed_id_in_company_24hr_for_mmi_2, 14." The key-value pair combination may be an optimum solution, as it provides advantages of being able to use the key as a primary-key, and make it easier to do operations on the value. A key may be a string, which may include a unique name and a node number. A value may reflect a number that corresponds to a primary key of a transactions table that lists data updates to a relational database.

A marker may also identify an object type. For example, if a database includes a transactions table for updating data for business contacts and another transactions table for updating data for companies, a marker may identify whether it is a marker for "contacts" or a marker for "companies." In this situation, a node may process the updates for contacts separately from processing the updates for companies, and use the corresponding markers to enable the batch processing of each object type independent of the other object type processing. While these examples depict a process name that identifies a record based on a numerical value, other identifiers are possible. A marker may be formatted based on a process name, an object name, and a node name, such as "MatchRecordsJob_Contacts_App01." Although these examples depict the two object types of contacts and companies, nodes may use markers for any number of different types of objects.

In block 104, another marker is optionally stored that identifies another node in the on-demand system and identifies the most recent data record processed in a relational database management system by the other node. By way of example and without limitation, this can include an application server number 02 storing "9025000_App02" in the transaction table in the relational database to identify that the application server number 02 last processed data update record number 9,025,000. Since each node uses its own corresponding markers, each node may batch process data records without dependencies on any other nodes. Multiple nodes may read and push the same data to different clients independent of the other nodes. This implementation enables easy horizontal scaling, allowing additional nodes to be added for servicing additional clients.

In block 106, a marker is used to query a database management system to identify a batch of records for a node to process. In embodiments, this can include the application server number 01 using the marker "9000000_App01" to query the relational database management system for the next 50,000 data update records that are sequentially greater than the data update record number 9,000,000 for application server number 01 to process. If the application server number 01 has a batch size of 40,000, then the application server number 01 queries the relational database management system for the next 40,000 data update records that are sequentially greater than the data update record number 9,000,000. If the application server number 01 has a batch size of 60,000, then the application server number 01 queries the relational database management system for the next 60,000 data update records that are sequentially greater than the data update record number 9,000,000. Although these examples illustrate record numbers that increment as records are added, the use of record numbers that decrement as records are added is also possible.

A batch size may be based on the maximum amount of data update records that an application server can theoretically process before the application server is scheduled to process data updates again. In contrast, a prior art application server fails to process all 2 million data updates between 9:30 AM and 10:00 AM, and then sits idle between 10:00 AM and 10:30 AM without processing the previously unprocessed data updates. By using batch processing, a node may process as many data updates as it reasonably can be expected to process until scheduled to execute again, and continue batch processing until any backlog of data updates has been processed during instances when fewer data updates are added to the relational database management system.

In block 108, a batch of records is processed by a node to update a client of data changes reflected by the batch of records. For example and without limitation, this can include the application server number 01 processing the data update records from number 9,000,001 to number 9,050,000, and conveying selected updates to subscribing clients. If only 20,000 data updates have been added to the relational database since the last processing by the application server number 01, then the application server number 01 processes the update records from number 9,000,001 to number 9,020,000, and stores "9020000_App01" in the transaction table in the relational database to identify that application server number 01 last processed update record number 9,020,000. If an application server is facing a significant backlog of data updates, the application server may process its maximum batch size repeatedly over an extended period of time. In some embodiments under these significant backlog circumstances, the application server may temporarily auto-correct its next scheduled execution time to more quickly reduce the backlog of data updates if the application server determines that extra time is left for processing after the previous processing of updates. Auto-correct scheduling may assist offline nodes in catching up with their data update backlogs more efficiently.

In block 110, another marker is optionally used to query a database management system to identify another batch of records for the other node to process. By way of example and without limitation, this can include the application server number 02 using the marker "9025000_App02" to query the relational database management system for the next 50,000 data update records that are sequentially greater than the data update record number 9,025,000 for application server number 02 to process.

In block 112, another batch of records is optionally processed by the other node to update another client of data changes reflected by the other batch of records. In embodiments, this can include the application server number 02 processing the data update records from number 9,025,001 to number 9,075,000, and conveying selected updates to subscribing clients.

Accordingly, systems and methods are provided for the batch processing of data records in an on-demand system, which enables load distribution across time, which also enables offline nodes to catch up with their data update processing when returned online. The method 100 may be repeated as desired. Although this disclosure describes the blocks 102-112 executing in a particular order, the blocks 102-112 may be executed in a different order.

Figure 2:
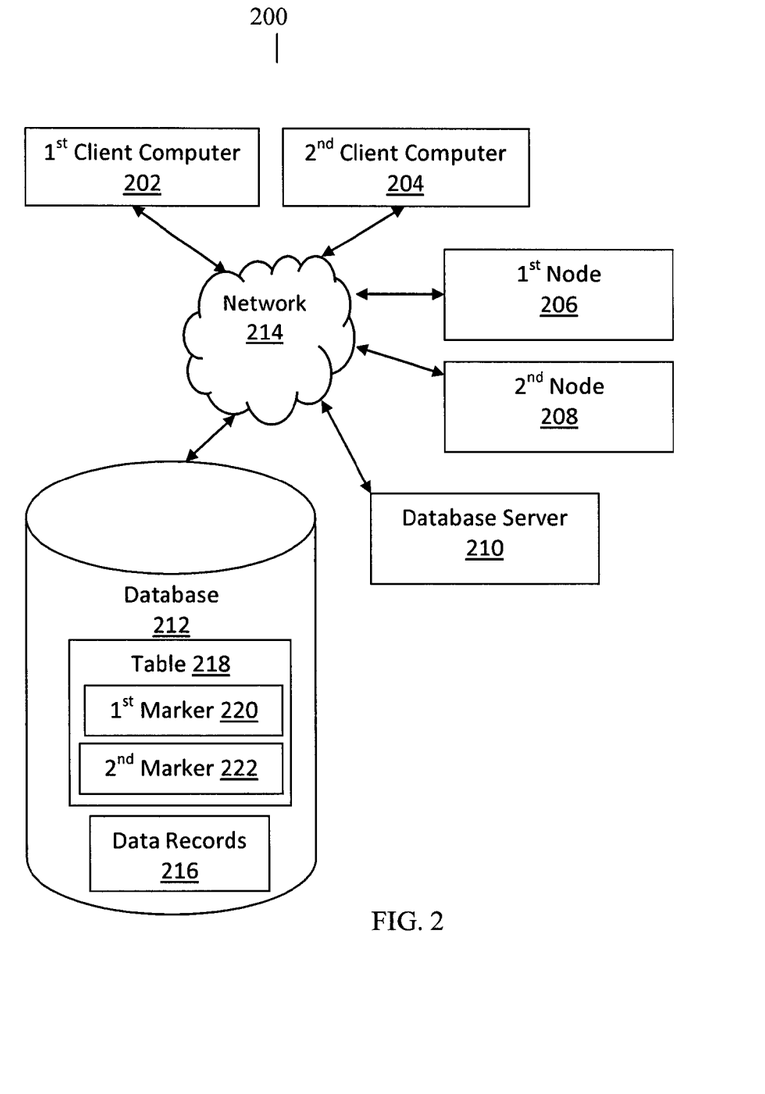
FIG. 2 illustrates a block diagram of an example of a system for batch processing of data records in an on-demand system.

FIG. 2 illustrates a block diagram of an example system for batch processing of data records in an on-demand system. As shown in FIG. 2, a system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of data for different client users. In an embodiment, the system 200 represents a cloud computing system that includes a first client computer 202, a second client computer 204, a first node 206, a second node 208, a database server 210, and a database 212 that communicate via a network 214. The client computers 202-204, which may be mobile computing devices, enable users to communicate with the database server 210 via the nodes 206-208 in a distributed system. The database 212 includes data records 216, and a table 218, which includes a first marker 220 and a second marker 222. Although FIG. 2. depicts the table 218 and the markers 220-222 residing in the database 212, the table 218 and the markers 220-222 may reside additionally or alternatively elsewhere in the system 200. Although FIG. 2 depicts the system 200 with one of each of the elements 202-222, the system 200 may include any number of each of the elements 202-222.

A node stores a marker that identifies the node and identifies the most recent data record processed in a relational database management system by the node. For example, the first node 206 stores "9000000_Node206" as the first marker 220 in the table 218 in the database 212 to identify that the first node 206 last processed data update record number 9,000,000 in the data records 216. Another node may store another marker that identifies the other node and identifies the most recent data record processed in the relational database management system by the other node. For example, the second node 208 may store "9050000_Node208" as the second marker 222 in the table 218 in the database 212 to identify that the second node 208 last processed data update record number 9,025,000 in the data records 216. The node uses the marker to query the database management system to identify a batch of records for the node to process. For example, the first node 206 uses the first marker 220, "9000000_Node206," to query the database server 210 for the next 50,000 data update records that are sequentially greater than the data update record number 9,000,000 for the first node 206 to process.

The batch of records is processed by the node to update a client of data changes reflected by the batch of records. For example, the node 206 processes the data update records from number 9,000,001 to number 9,050,000, and conveys selected updates to the first client computer 202. The other node may use the other marker to query the database management system to identify another batch of records for the other node to process. For example, the second node 208 uses the second marker 222, "9025000_Node208" to query the database server 210 for the next 50,000 update records that are sequentially greater than the update record number 9,025,000 for the second node 208 to process. The other batch of records may be processed by the other node to update another client of data changes reflected by the other batch of records. For example, the second node 208 processes the update records from number 9,025,001 to number 9,075,000, and convey selected updates to the second client computer 204. Accordingly, systems and methods are provided for the batch processing of data records in an on-demand system, which enables load distribution across time, which also enables offline nodes to catch up with their data update processing when returned online.

System Overview

Figure 3:
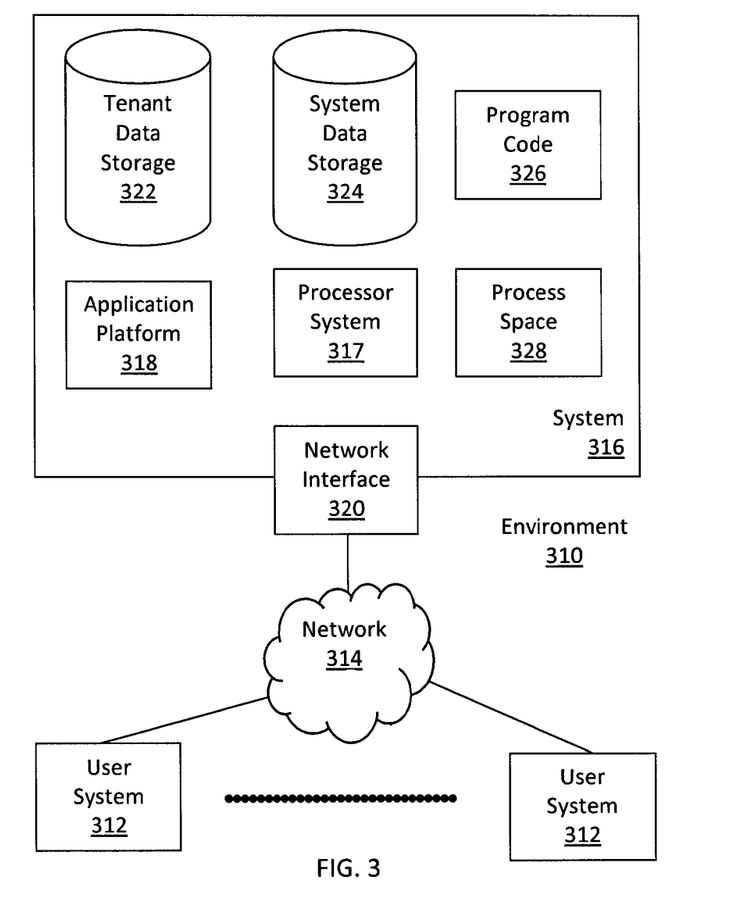
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein.

Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known.

It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
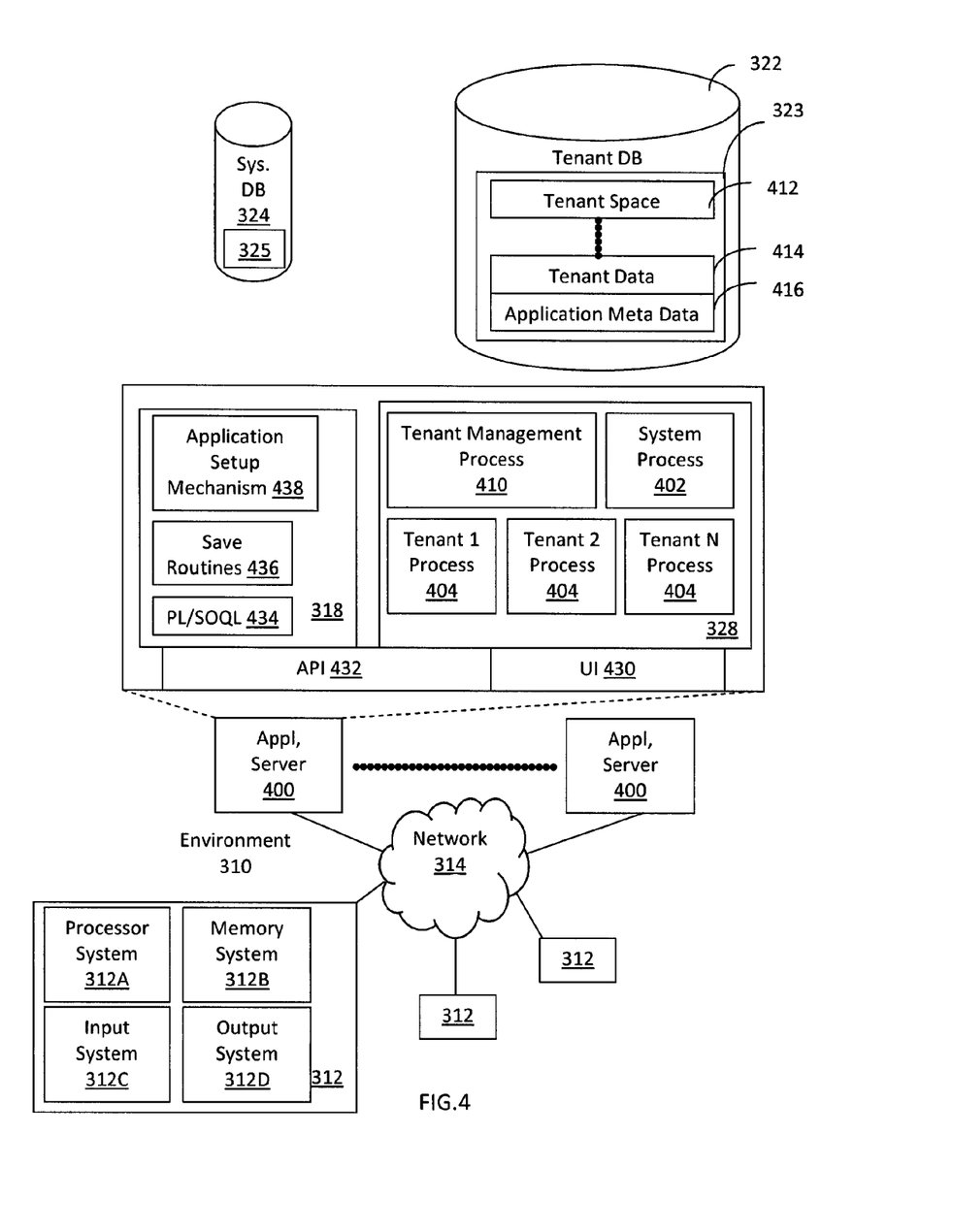
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for batch processing of data records in an on-demand system, the apparatus comprising:
  a processor; and
  a non-transitory computer readable medium storing a plurality of instructions which,
  when executed by the processor, cause the processor to carry out the steps of:
    storing a first marker that identifies a first node in an on-demand system and identifies a most recent data record processed in a relational database management system by the first node;
    storing a second marker that identifies a second node in the on-demand system and identifies a most recent data record processed in the relational database management system by the second node;
    using the first and second markers to query the database management system to identify a first batch of records for the first node to process and a second batch of records for the second node to process; and
    processing the first batch of records by the first node to update a first client of data changes reflected by the first batch of records and the second batch of records by the second node to update a second client of data changes reflected by the second batch of records.

2. The apparatus of claim 1, wherein storing the first and second markers comprises storing the first and second markers in a transactions table associated with the relational database management system.

3. The apparatus of claim 1, wherein each of the first and second markers further identifies a data record type.

4. The apparatus of claim 1, wherein the first and second batches of records are each based on a maximum batch size.

5. A computer program product, comprising a non-transitory computer-readable medium carrying one or more sequences of instructions for batch processing of data records in an on-demand system, which instructions, when executed by one or more processors, cause the one or more processors to:
  store a first marker that identifies a first node in an on-demand system and identifies a most recent data record processed in a relational database management system by the first node;
  store a second marker that identifies a second node in the on-demand system and identifies a most recent data record processed in the relational database management system by the second node;
  use the first and second markers to query the database management system to identify a first batch of records for the first node to process and a second batch of records for the second node to process; and
  process the first batch of records by the first node to update a first client of data changes reflected by the first batch of records and the second batch of records by the second node to update a second client of data changes reflected by the second batch of records.

6. The computer program product of claim 5, wherein storing the first and second markers comprises storing the first and second markers in a transactions table associated with the relational database management system.

7. The computer program product of claim 5, wherein each of the first and second markers further identifies a data record type.

8. The computer program product of claim 5, wherein the first and second batches of records are each based on a maximum batch size.

9. A method for batch processing of data records in an on-demand system, the method comprising:
  storing a first marker that identifies a first node in an on-demand system and identifies a most recent data record processed in a relational database management system by the first node;
  storing a second marker that identifies a second node in the on-demand system and identifies a most recent data record processed in the relational database management system by the second node;

using the first and second markers to query the database management system to identify a first batch of records for the first node to process and a second batch of records for the second node to process; and processing the first batch of records by the first node to update a first client of data changes reflected by the first batch of records and the second batch of records by the second node to update a second client of data changes reflected by the second batch of records.

10. The method of claim 9, wherein storing the first and second markers comprises storing the first and second markers in a transactions table associated with the relational database management system.

11. The method of claim 9, wherein each of the first and second markers further identifies a data record type.

12. The method of claim 9, wherein the first and second batches of records are each based on a maximum batch size.

13. A method for transmitting code for batch processing of data records in an on-demand system on a transmission medium, the method comprising:

transmitting code to store a first marker that identifies a first node in an on-demand system and identifies a most recent data record processed in a relational database management system by the first node;

transmitting code to store a second marker that identifies a second node in the on-demand system and identifies a most recent data record processed in the relational database management system by the second node;

transmitting code to use the first and second markers to query the database management system to identify a first batch of records for the first node to process and a second batch of records for the second node to process; and transmitting code to process the first batch of records by the first node to update a first client of data changes reflected by the first batch of records and the second batch of records by the second node to update a second client of data changes reflected by the second batch of records.

14. The method for transmitting code of claim 13, wherein storing the first and second markers comprises storing the first and second markers in a transactions table associated with the relational database management system.

15. The method for transmitting code of claim 13, wherein each of the first and second markers further identifies a data record type.

16. The method for transmitting code of claim 13, wherein the first and second batches of records are each based on a maximum batch size.

\* \* \* \* \*